(12) United States Patent
Hagelin

(10) Patent No.: US 7,467,121 B2
(45) Date of Patent: *Dec. 16, 2008

(54) METHOD OF ESTABLISHING RULES FOR A DEVICE WHICH IS INTENDED TO BE ABLE TO BE USED FOR GENERATING DECISION SUPPORT

(75) Inventor: Hans-Ove Hagelin, Linköping (SE)

(73) Assignee: SAAB AB, Linkoping (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/809,717

(22) Filed: Mar. 26, 2004

(65) Prior Publication Data

US 2004/0193563 A1 Sep. 30, 2004

(30) Foreign Application Priority Data

Mar. 28, 2003 (SE) .................................... 0300894

(51) Int. Cl.
*G06F 17/00* (2006.01)
*G06N 5/02* (2006.01)
(52) U.S. Cl. ...................................................... 706/47
(58) Field of Classification Search .................. 706/46, 706/47, 905; 701/11; 434/35
See application file for complete search history.

(56) References Cited

U.S. PATENT DOCUMENTS

| 4,868,755 | A | * | 9/1989 | McNulty et al. ................ 701/1 |
| 4,930,084 | A | * | 5/1990 | Hosaka et al. ................. 701/98 |
| 5,005,143 | A | * | 4/1991 | Altschuler et al. ........... 702/181 |
| 5,006,992 | A |   | 4/1991 | Skeirik .......................... 706/58 |

(Continued)

FOREIGN PATENT DOCUMENTS

WO     WO 01/52008     7/2001

(Continued)

OTHER PUBLICATIONS

Decision making on the flight deck Donnelly, D.M.; Noyes, J.M.; Johnson, D.M.; Decision Making and Problem Solving (Digest No. 1997/366), IEE Colloquium on Dec. 16, 1997 pp. 3/1-3/4.*

(Continued)

*Primary Examiner*—Michael B Holmes
(74) *Attorney, Agent, or Firm*—Venable LLP; Michael Sartori; Jeffri A. Kaminski

(57) ABSTRACT

The invention concerns a method of establishing rules (14) for a specific device which is intended to be able to be used for generating decision support for decisions which determine the behavior of an entity (44) and/or for controlling the behavior of an entity (44). The device is, inter alia, arranged to present a decision support window which comprises at least one area (56) which represents a state (30), wherein this area (56) comprises names which identify different rules (14) which form part of the state (30). The method according to the invention comprises the steps that the device is run in a real or simulated version of said entity (44), that said decision support window is presented to a user, that the user makes decisions by inputting instructions, that the decisions which have been made by the user are analysed, and that the rules (14) for which the user has made decisions are determined or modified in accordance with the analysis which has been carried out.

12 Claims, 5 Drawing Sheets

U.S. PATENT DOCUMENTS

| | | | | |
|---|---|---|---|---|
| 5,162,997 | A * | 11/1992 | Takahashi | 701/1 |
| 5,566,295 | A * | 10/1996 | Cypher et al. | 715/763 |
| 5,602,733 | A * | 2/1997 | Rogers et al. | 701/29 |
| 5,978,715 | A * | 11/1999 | Briffe et al. | 701/11 |
| 6,259,977 | B1 | 7/2001 | Mayer et al. | 701/14 |
| 6,382,554 | B1 * | 5/2002 | Hagelin | 244/3.15 |
| 6,419,185 | B1 * | 7/2002 | Hagelin et al. | 244/3.15 |
| 6,772,055 | B2 * | 8/2004 | Hagelin | 701/27 |
| 7,009,610 | B1 | 3/2006 | Keeley | 345/440 |
| 7,039,623 | B1 * | 5/2006 | Keeley | 706/46 |
| 7,047,279 | B1 | 5/2006 | Beams et al. | 709/204 |
| 7,069,234 | B1 * | 6/2006 | Cornelius et al. | 705/26 |
| 7,080,290 | B2 * | 7/2006 | James et al. | 714/47 |
| 7,099,796 | B2 * | 8/2006 | Hamza | 702/150 |
| 7,099,854 | B2 * | 8/2006 | Liongosari | 706/45 |
| 7,124,101 | B1 * | 10/2006 | Mikurak | 705/35 |
| 7,130,779 | B2 * | 10/2006 | Beverina et al. | 703/6 |
| 7,130,807 | B1 * | 10/2006 | Mikurak | 705/7 |
| 7,149,720 | B2 * | 12/2006 | Shepherd | 705/37 |
| 7,152,092 | B2 * | 12/2006 | Beams et al. | 709/204 |
| 7,159,208 | B2 * | 1/2007 | Keeley | 717/109 |
| 7,167,844 | B1 * | 1/2007 | Leong et al. | 705/80 |
| 7,191,140 | B2 * | 3/2007 | Yu et al. | 705/7 |
| 7,213,174 | B2 * | 5/2007 | Dahlquist et al. | 714/37 |
| 7,222,066 | B1 * | 5/2007 | Oon | 704/9 |
| 7,231,327 | B1 * | 6/2007 | Beverina et al. | 703/2 |
| 7,240,018 | B2 * | 7/2007 | Thengvall et al. | 705/9 |
| 7,280,991 | B1 * | 10/2007 | Beams et al. | 706/46 |
| 7,289,964 | B1 * | 10/2007 | Bowman-Amuah | 705/1 |
| 7,308,388 | B2 * | 12/2007 | Beverina et al. | 703/6 |
| 7,345,528 | B2 * | 3/2008 | Zanchi et al. | 327/562 |

FOREIGN PATENT DOCUMENTS

WO     WO 01/52221     7/2001

OTHER PUBLICATIONS

Testing of an on-board emergency flight planner Chen, T.L.; Pritchett, A.R.; Digital Avionics Systems Conferences, 2000. Proceedings. DASC. The 19$^{th}$ vol. 2, Oct. 7-13, 2000 pp. 5E2/1-5E2/8 vol. 2 Digital Object Identifier 10.1109/DASC.2000.884890.*

From kinematics to symbolics for situation and threat assessment Johnson, W.T.; Dall, I.W.; Information, Decision and Control, 1999. IDC 99. Proceedings. Feb. 8-10, 1999 pp. 497-502 Digital Object Identifier 10.1109/IDC.1999.754206.*

* cited by examiner

METHOD OF ESTABLISHING RULES FOR A DEVICE WHICH IS INTENDED TO BE ABLE TO BE USED FOR GENERATING DECISION SUPPORT

BACKGROUND OF THE INVENTION

The present invention concerns a method of establishing rules for a device which is intended to be able to be used for generating decision support for decisions which determine the behavior of an entity and/or for controlling the behavior of an entity.

WO 01/52008 A1 and WO 01/52221 A1 describe a device and a system with a rule system concerning the behavior of a real or simulated vehicle. These documents describe different advantageous manners of constructing and implementing the rule handling for said behavior. The documents describe a device which comprises a supervising unit arranged to handle a rule system for a behavior, wherein the supervising unit comprises at least one storage member in which a set of rules is stored, a user interface comprising first means for presenting information to a user of the device and second means for inputting instructions to said supervising unit. The device is arranged such that a rule comprises one or more premises which shall be able to either be true or false and one or more predetermined and pre-programmed conclusions. The device is also such that said rules are such that each premise in the rule can be assigned an indicator which can indicate at least two different conditions, namely a first condition which means that the premise shall be true and a second condition which means that the premise shall be false. At least one conclusion is meant to be executed if all of said premises fulfill the conditions set by the assigned indicators. The device is further arranged such that the rule system is divided into a plurality of states for different parts of said behavior, wherein each state comprises one or more of said rules.

In particular the document WO 01/52221 also describes a method of generating rules for the behavior of a vehicle and/or of a driver of a vehicle. According to this method the behavior of a vehicle and/or of a driver of a vehicle is established by determining whether a plurality of predefined and pre-programmed premises are fulfilled and whether a plurality of predefined and pre-programmed conclusions are carried out at different moments in time during an imaginary or real operation of the vehicle. The result of this establishment is treated in order to create a set of rules. Said establishment can be done by detecting the behavior of a real vehicle and/or of a driver of a vehicle.

SUMMARY OF THE INVENTION

It has become clear that it is relatively complicated to generate rules with the help of the above describe method.

The present invention thus provides, among other things, a method which makes it easier to establish rules, in particular for a device which is intended to be able to be used for generating decision support for decisions which determine the behavior of an entity and/or for controlling the behavior of an entity.

The invention is achieved with a particular method wherein a particular device is used which simplifies the establishment of the rules. The particular device which is used in the method according to the invention includes a supervising unit arranged to handle a rule system for the behavior, wherein the supervising unit comprises at least one storage member in which a rule structure comprising a set of completely or partly ready-formulated rules for the behavior is stored, and a user interface comprising first means for presenting information to a user of the device and second means for inputting instructions to said supervising unit.

In one aspect of the invention, the device is arranged such that a rule within said rule structure includes one or more premises and one or more conclusions.

In a particularly preferred embodiment, the device is arranged such that the rule system is divided into a plurality of states for different parts of said behavior, wherein each state comprises one or more of said rules.

The device of the invention is also arranged to, via said first means, present a decision support window which comprises at least one area which represents one of said states, wherein this area comprises names which identify different rules which form part of the state.

A method according to one aspect of the invention includes the steps of running the above mentioned device in a real or simulated version of said entity in such a manner that the entity goes through a behavior or a behavior scenario, presenting said decision support window to a user, having the user make decisions by, via said second means, inputting instructions which mean that one or more conclusions which form part of a certain rule, the name of which is currently shown in said area in the decision support window, shall be executed, analyzing the decisions which have been made by the user, and determining or modifying the rules for which the user has made decisions concerning that one or more conclusions shall be executed in accordance with the analysis that has been carried out.

Since the device is arranged with said decision support window, the possibility of the user to input instructions concerning decisions is essentially simplified. Since the decision support window shows different names which identify the rules, it is simple to a user to input instructions which mean that a certain rule, i.e., the conclusion or conclusions of the rule, shall be executed. Since the device according to the method is run in a real or simulated version of said entity, the user can in a realistic manner make decisions concerning said behavior as the device is run. The user may thus in a simple manner observe or take part in when the device is run and thereby with the help of the information which is presented in the decision support window in a simple manner make decisions. These decisions are analysed in order to establish different rules. Since the device is arranged with a rule structure as defined above and since the device is arranged with different states, the possibility of a user to make decisions is simplified and improved in accordance with the method according to the invention.

As will become clear from the description below, the method according the invention may be used both for establishing new rules and for modifying already generated rules. The rule structure is thus such that it comprises a set of rules which are completely or partly ready-formulated. With "partly ready-formulated" is thus meant that the rule structure itself is predetermined in the manner which has been defined above, while on the other hand the rules in question are not necessarily completely ready-formulated. For example the premises may be formulated although the below described indicators have not yet been established.

It should be noted that said entity may be almost any entity. The expression "behavior" should be interpreted broadly. The behavior may thus be a behavior of, for example, an apparatus or a system which in some manner is influenced by the made decisions.

It should also be noted that the expression "name" shall herein be broadly interpreted. The name may suitably constitute a combination of letters in a natural language. This is however not necessary. The name may also constitute some other kind of symbol which symbolises the rule in question.

According to a preferred embodiment of the method according to the invention, the device which is used in the method is arranged with such a rule structure that said premises shall be able to either be true or false and such that said conclusions are predetermined and pre-programmed. The device is also arranged such that said rule structure is such that each premise in the rule can be assigned an indicator which can indicate at least two different conditions, namely a first condition which means that the premise shall be true and a second condition which means that the premise shall be false, wherein at least one conclusion is meant to be executed if all of said premises fulfill the conditions set by the assigned indicators. According to this embodiment, the method is such that said rules which are determined or modified in accordance with the analysis which has been carried out are determined or modified in that the premises for these rules are determined or modified in accordance with the analysis which has been carried out. Since the device is arranged in this manner, with said indicators for the premises, the handling of the rules is simplified. It is thereby advantageous that the premises of the rules are determined or modified in accordance with the analysis of the made decisions.

According to a further preferred embodiment of the method according to the invention, the device which is used in the method is arranged such that said rule structure is such that each premise in the rule also can be assigned an indicator which can indicate a third condition which means that it does not matter whether the premise is true or false in order for said one or more conclusions to be intended to be executed. Hereby the rule handling is further simplified. A rule may thus have predefined premises. Then it can be determined whether these premises shall be fulfilled or not. According to this embodiment, it is also possible to determine that it does not matter whether a certain premise is true or false in order for the conclusion or conclusions in the rule to be executed.

According to a further preferred embodiment of the method according to the invention, the device which is used in the method is arranged such that said rules are only partly ready-formulated such that at least a plurality of premises, which can be true or false, are defined for plurality of said rules, but without these premises yet have been assigned any of said indicators which indicate some of said conditions, wherein when said device is run, it is registered whether said plurality of premises are true or false at the occasions when the user makes said decisions which mean that one or more conclusions which form part of a certain rule shall be executed. In such a manner, the method can be used for establishing rules which in advance are only partly ready-formulated.

According to a further preferred embodiment of the method according to the invention, the obtained registrations are statistically processed, after that said registration has been done at one or more runs, whereafter ready-formulated rules are established. By such a statistical processing, the statistical basis for the established rules is improved. Preferably, the registration is done at a plurality of runs in order to improve the statistical basis.

According to another preferred embodiment of the method according the invention, the device which is used in the method is arranged such that said rules comprise a plurality of premises which comprise at least one parameter which, when a value for this parameter has been determined, causes the premise to have a truth value such that the premise is true or false, wherein said rules are only partly ready-formulated such that at least a plurality of premises are defined without a value of said parameter has been determined, wherein when said device is run, the value of said parameters are registered at the occasions when the user makes said decisions which mean that one or more conclusions which form part of a certain rule shall be executed. Through this method, the establishment of the rules is further simplified since also at least some parameter values which shall form part of the rules can be established.

According to a further preferred embodiment of the method according to the invention, the obtained registrations are statistically processed, after that said registration has been done at one or more runs, whereafter suitable values for the parameters in the rules are established. Preferably, the parameters are registered at a plurality of runs. By statistically processing the obtained results, suitable parameters for the rules can be determined with an increased certainty.

According to another preferred embodiment of the method according to the invention, the device which is used in the method is arranged such that at least a plurality of said rules are ready-formulated in such a manner that at least a plurality of premises are defined for the rules such that the premises have a truth value such that the premises are true or false and such that these premises have been assigned said indicators, wherein the device is arranged such that the user can make decisions which mean that one or more conclusions which for part of a certain rule shall be executed even if the ready-formulated rule in question does not say that the conclusion or conclusions shall be executed, wherein when said device is run, the user makes said decisions which mean that one or more conclusions which form part of a certain rule shall be executed, wherein registration takes place, at the occasions when the user makes said decisions, of whether the premises were true or false. According to this embodiment of the method, there are thus already ready-formulated rules in the device. The user may however make decisions which go against the decisions which the ready-formulated rules indicate.

According to a preferred embodiment of the method according to the invention, a comparison is done between said registrations at the run and said ready-formulated rules. By making this comparison, a basis is obtained for modifying the ready-formulated rules.

According to a further preferred embodiment of the method according to the invention, said ready-formulated rules are reformulated on the basis of said comparison. Preferably, the device may be run a plurality of times in order to obtain a better basis for said comparison. On the basis of this comparison, the ready-formulated rules may thus be reformulated.

According to a further preferred embodiment of the method according to the invention, the device which is used in the method is arranged such that the rule structure is such that each conclusion in a rule is assigned an indicator which can indicate two different cases, a first case which indicates that the conclusion shall be executed and a second case which indicates that the conclusion shall not be executed, wherein a conclusion is meant to be executed if all of said premises in the rule fulfil the conditions set by the assigned indicators and the indicator of the conclusion indicates said first case. Since also the conclusions are assigned such indicators, the handling of the rules is further simplified.

According to still another preferred embodiment of the method according to the invention, the device which is used in the method is such that the rule system is divided into a plurality of rule blocks, each of which comprises one or more rules, wherein each state comprises one or more rule blocks, wherein the rules within a certain rule block concern a certain aspect of the behavior within the state in question and wherein the device is arranged such that said area in the decision support window also comprises the name of one or more rule blocks which for part of the state. Since the device is arranged such that the rule system is also divided into a plurality of rule blocks, the handling of the rules is further simplified. This makes it easier for a user to make decisions in accordance with what has been described above.

According to still a preferred embodiment of the method according to the invention, the device which is used in the method is arranged such that said name of a rule which is shown in said area in the decision support window is shown within a marked area, wherein the device is arranged such that the user inputs said instructions, which mean that one or more conclusions which form part of a certain rule shall be executed, by inputting a command when a marker is at or on said marked area. According to this embodiment, the possibility of a user to input the decisions which are made is simplified. For example, the decisions can be inputted in that the user clicks with the computer mouse when the marker is within the marked area.

BRIEF DESCRIPTION OF THE DRAWINGS

The present invention will now be explained with the help of different embodiments given as examples and with reference to the annexed drawings.

DETAILED DESCRIPTION OF THE PREFERRED EMBODIMENTS

Figure 4:
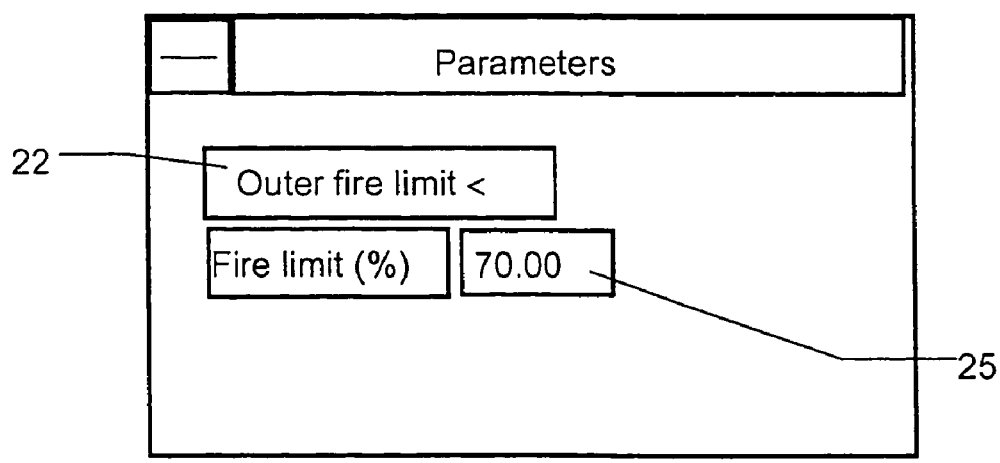
FIG. 4 shows an example of a parameter window which can be shown with the help of the device.
Figure 2:
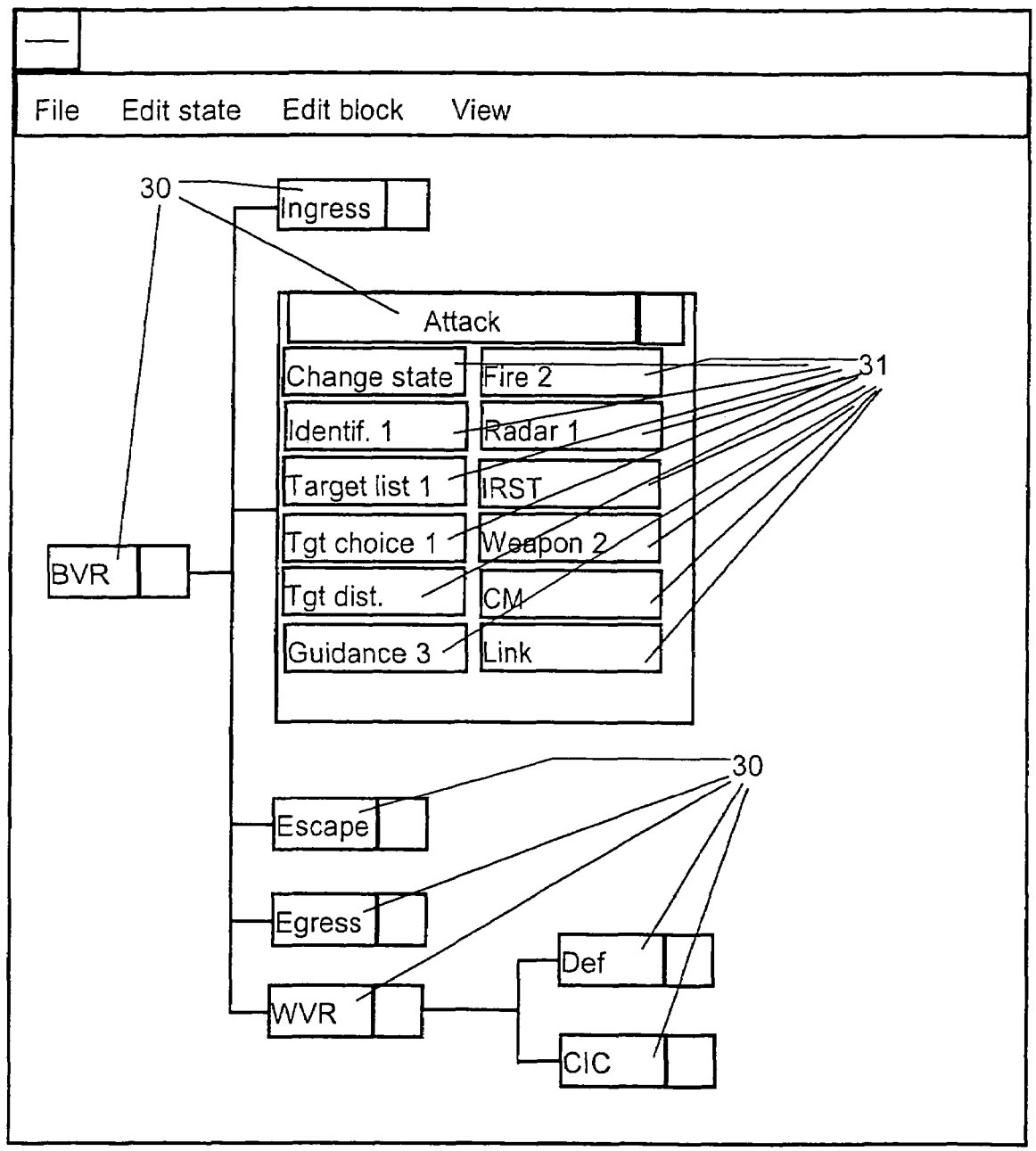
FIG. 2 shows an example of a window with states which can be shown with the help of the device of FIG. 1.
Figure 3:
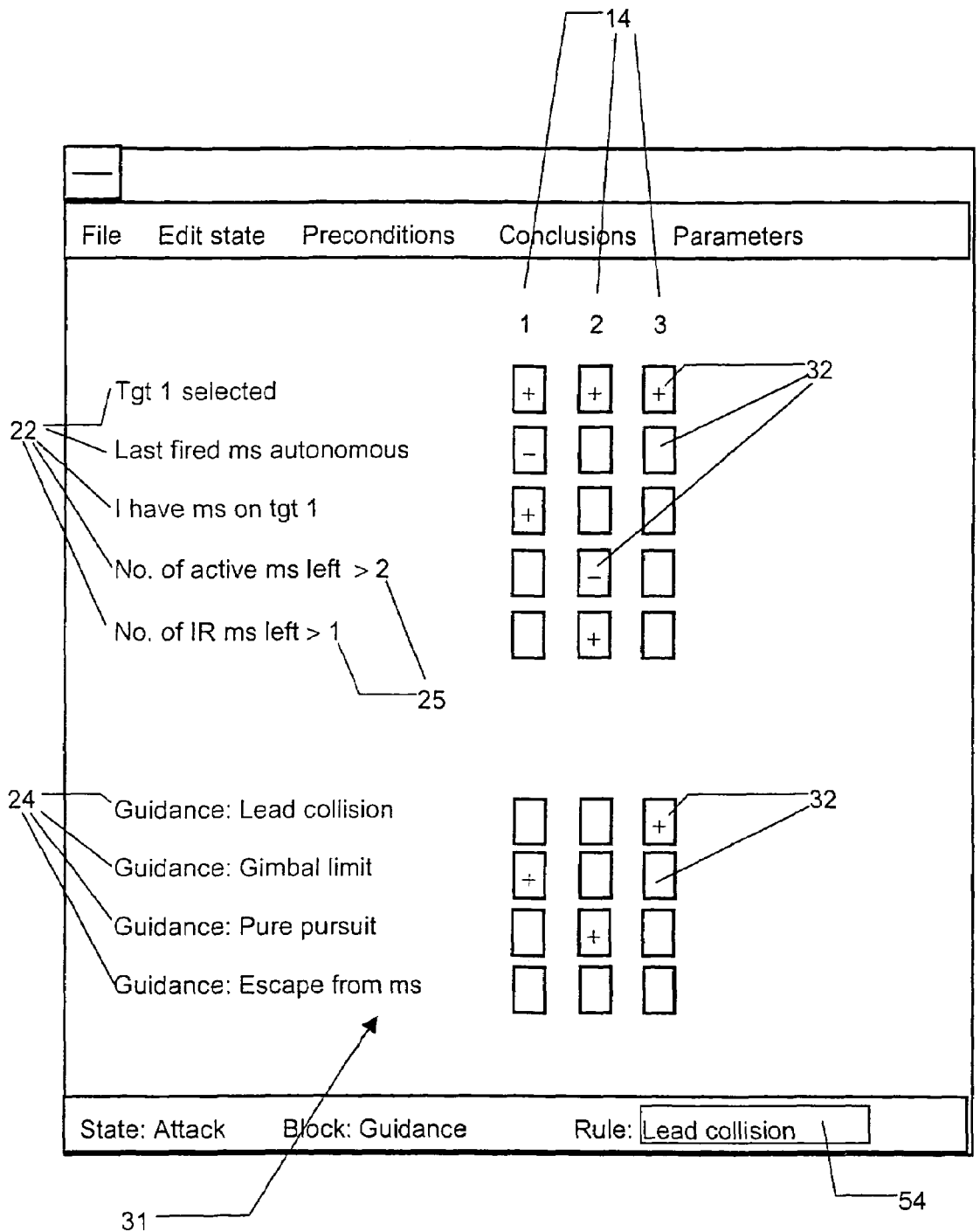
FIG. 3 shows an example of a rule block window which can be shown with the help of the device.

A particular device is used in the method according to the invention. First, an embodiment of this device will be described with reference to FIGS. 1-5. It should be noted that several of the aspects which concern the rule handling in this device are already known from the above cited WO-publications. In particular, that which is described with reference to FIGS. 2, 3 and 4 is to a large extent known from these documents.

The invention thus concerns a method of establishing rules 14 for a device which is intended to be able to be used for generating decision support for decisions which determine the behavior of an entity 44 and/or for controlling the behavior of an entity 44. Said entity 44 may be almost any entity. The entity 44 may for example be a person who shall carry out a certain work with the help of a decision support. Preferably, the entity 44 is however some kind of system or apparatus. In the example given below, the entity 44 is an aircraft.

According to the embodiment of the device which is described below, information is presented to a user in the form of different windows on for example a computer screen.

It should be noted that the invention is in no way limited to the text which is shown in the figures below. This text shall thus only be seen as an example of the use of the invention.

Figure 1:
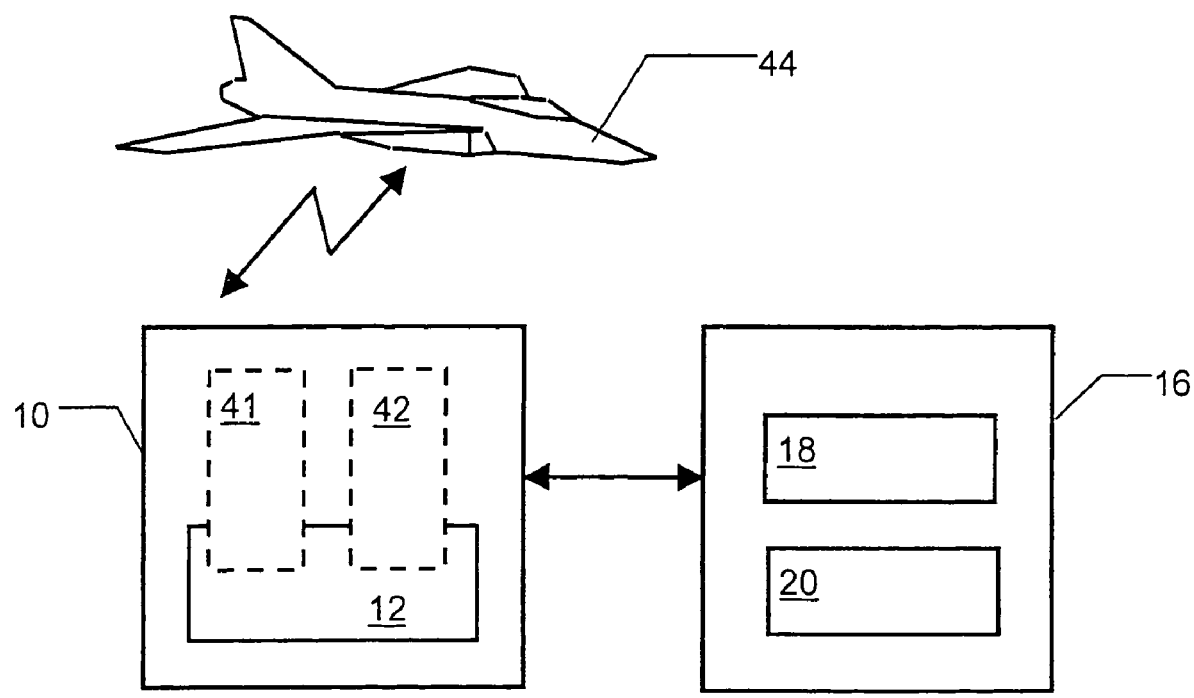
FIG. 1 shows schematically a device which can be used in the method according to one aspect of the present invention.

FIG. 1 shows schematically a device. The device comprises a supervising unit 10. Such a supervising unit 10 may consist of a computer, i.e. a technical device which automatically can take care of a rule handling in accordance with a program. The supervising unit 10 comprises at least one storage member 12. In this storage member 12 a rule structure comprising a set of completely or partly ready-formulated rules 14 (see FIG. 3) is stored. These rules 14 are intended to control the behavior of an entity 44. The entity 44 may for example be some kind of apparatus, process or system. The device is intended to generate decision support for the decisions which for example an operator of the entity 44 has to make. The device may also be arranged to automatically control the whole behavior of the entity 44 or a part of the behavior of the entity 44. The device also comprises a user interface 16. The user interface 16 includes first means 18 for presenting information to a user. These first means 18 may, for example, include a viewing screen, loudspeakers or the like. The user interface 16 also includes second means 20 for inputting instructions to the supervising unit 10. These second means 20 may for example constitute a keyboard, a joystick, a computer mouse, a microphone or the like.

Figure 5:
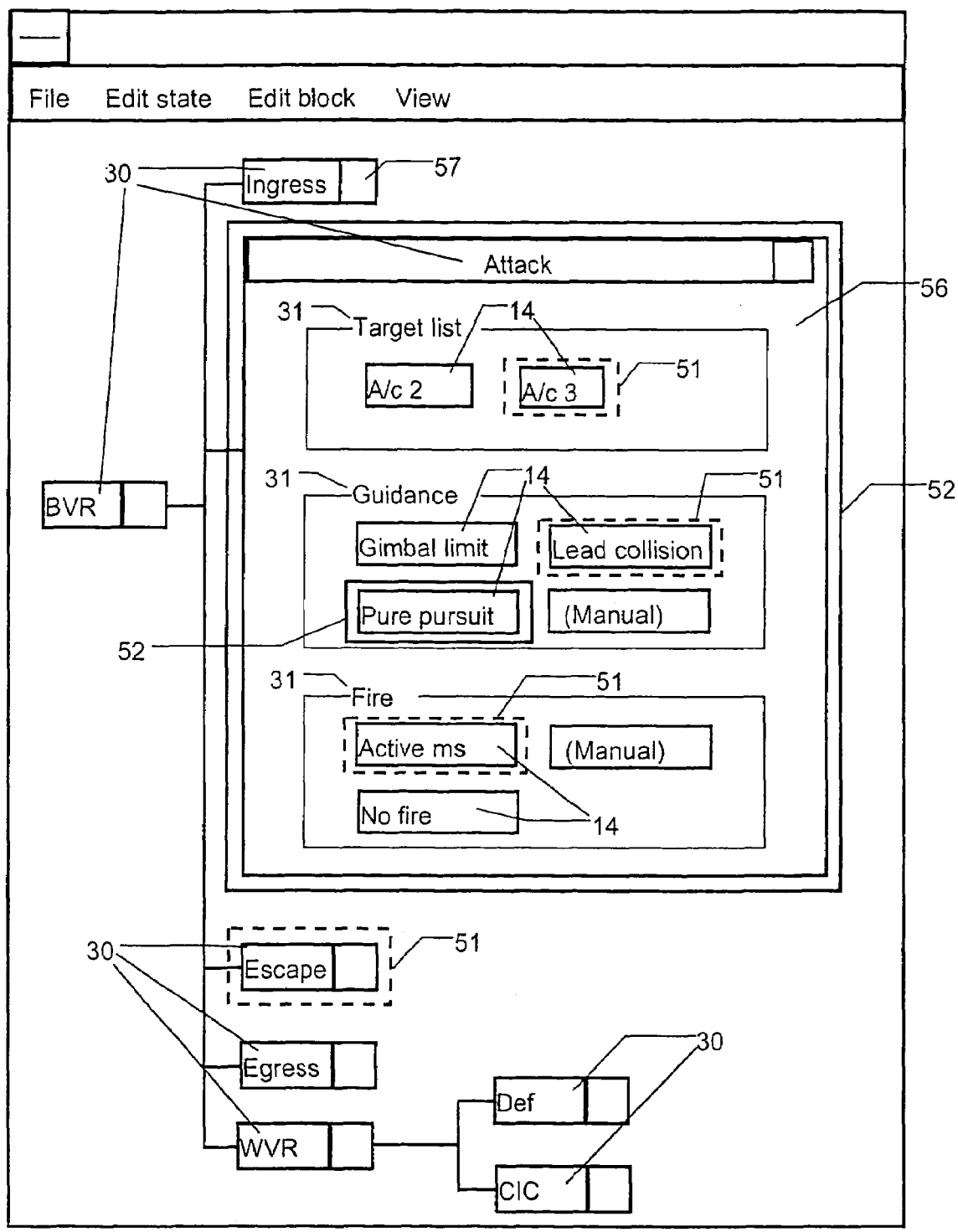
FIG. 5 shows an example of a decision support window which the device according to the invention is arranged to show.

The device may according to a possible embodiment be arranged with at least a first rule handler 41 and a second rule handler 42. These rules handlers 41, 42 can for example constitute different aspects of the computer program which controls the rule handling. The first rule handler 41 is intended to execute the rules 14 according to a predetermined program for the rule handling. The second rule handler 42 can be activated by a user. For example in that the user via said second means 20 inputs instructions. The second rule handler 42 is thereby activated and executes the rules in accordance with the instructions which have been inputted. At the same time, the first rule handler 41 continues with the execution of the rules. The device is arranged such that said first means 18 at the same time can present information concerning the rule handling which is carried out by the first rule handler 41 and the rule handling which is carried out by the second rule handler 42. This will be exemplified more closely below, in particular in connection with the decision support window which is shown in FIG. 5.

FIG. 1 also shows an entity in the form of an aircraft 44. The whole device may for example be positioned in the aircraft 44 itself. According to the invention, the device may also be run in a simulated version of said entity 44. Preferably, the device is arranged such that it by executing the rules 14 automatically controls at least a part of the behavior of the aircraft 44. Suitably, the aircraft 44 is normally controlled by the first rule handler 41. When the second rule handler 42 is activated, the aircraft 44 is however controlled by the second rule handler 42. When the second rule handler 42 is deactivated, the control of the aircraft 44 returns to the first rule handler 41.

In order to simplify for a user to get an overview over the function of the device and in order to in a simple manner being able to select different situations in the behavior of an entity 44, the device is arranged such that the rule system is divided into a plurality of states 30 (see FIG. 2). These states 30 represent different situations in which the entity 44 may be or different phases of the behavior of the entity 44. The states 30 are suitably arranged in a network or in a hierarchy of states 30. FIG. 2 shows such a hierarchy of states 30. A certain state 30 may thus have 0, 1 or more substates. FIG. 2 shows for example that the state which is marked with "Ingress" does not have any substate. On the other hand, the state which is marked with "WVR" has two substates. The device is suitably arranged to in response to a command from a user, for example via the keyboard or the computer mouse, show a window (FIG. 2) which illustrates the network or the hierarchy of states 30.

The device is also arranged such that a user may create new states 30 or remove states 30. States 30 may for example be added or removed by first clicking on a menu in the upper part of the window which illustrates said network or hierarchy of states 30. Alternatively, it is possible that new states 30 are created or that states 30 are removed by clicking with the computer mouse directly on the states 30 which are shown in the window. Concerning the hierarchy of states 30, for example, the following grouping is possible according to this embodiment: a highest level where it is indicated which kind of aeroplane is involved, a second level which indicates different kinds of missions which the aeroplane can carry out, a third level which states different phases of the different missions and so on.

The behavior of the entity 44 in a certain state 30 is controlled by a plurality of rules 14. The rules 14 which form part of a state 30 can be divided into a plurality of rule blocks 31. It is thus shown in FIG. 2 that the state 30, which is labelled "Attack", comprises twelve rule blocks 31. Each rule block 31 can concern a certain aspect of the state 30. Each rule block 31 thus includes the rule or rules 14 which are relevant to the rule block 31 in question.

As can be seen in FIG. 2, the device is arranged such that names which identify states 30 and rule blocks 31 are shown in the window. In response to a command from a user, for example the state window according to FIG. 2 with names of the states 30 which form part thereof is thus shown.

If an operator gives a suitable command, for example with the help of the computer mouse, a state 30 (such as the state "Attack" in FIG. 2) is enlarged such that the rule blocks 31 which form part thereof are shown.

The device is arranged to in response to a command from a user via the user interface 16 show a rule block 31 in more detail with the help of a rule block window (FIG. 3). Each rule 14 comprises, at least when the rule 14 is established in accordance with the method according to the invention, one or more premises 22 which may either be fulfilled or not fulfilled, i.e., they may be true or false. Furthermore, a rule 14 comprises one or more conclusions 24. The conclusions thus indicate for example some kind of behavior which the entity 44 shall perform. The rule block window in FIG. 3 comprises three rules 14 marked with 1, 2 and 3. Each rule 14 is thus represented by a column in the rule block window. In the rule block window all premises 22 and conclusions 24 which form part of the different rules 14 which are included in the rule block 31 are shown. In a similar manner as concerning the states 30, the device is arranged such that the user can add or remove premises 22 or conclusions 24 to or from the different rules 14.

Each premise 22 in an established rule 14 is assigned an indicator 32 which can indicate three different conditions, namely a first condition which means that the premise 22 shall be true, a second condition which means that the premise 22 shall be false and a third condition which means that it does not matter whether the premise 22 is true or false. Furthermore, suitably each conclusion 24 in a rule 14 is assigned an indicator 32 which can indicate two different cases: a first case which indicates that the conclusion 24 shall be executed and a second case which indicates that the conclusion 24 shall not be executed. A conclusion 24 is thus intended to be executed if all premises 22 which form part of the rule 14 fulfill the conditions which they are assigned with the indicators 32 and the indicator 32 of the conclusion 24 indicates that the conclusion 24 shall be executed. The different indications are marked in the columns for the respective rule 14 in the rule block window.

FIG. 3 shows examples of such indications 32 for the rules 14. The indication "+" indicates in this case that a premise 22 shall be true or that a conclusion 24 shall be executed. The indication "−" indicates that a premise 22 shall be false. A white square indicates that it does not matter whether the premise 22 in question is false or true. Concerning rule 2 in FIG. 3 it is thus the case that the conclusion 24 (Pure pursuit) should be executed if the first and fifth premises 22 are true and the fourth premise 22 is false. Said indications 32 may of course have another appearance than those shown. The indications 32 may thus for example constitute a black, white or grey square.

The device is arranged such that the user in a simple manner can change the different indications 32 for the premises 22 and the conclusions 24. For example, these indications 32 can be changed in that the user clicks with the computer mouse.

The device is also arranged such that a user can change the possible parameters 25 which form part of the premises 22 or the conclusions 24. This may, for example, be done by clicking on a menu in the upper part of the rule block window or by clicking in a certain manner (or with a certain computer mouse button), on the premise or conclusion in question. A parameter window (see FIG. 4) may thus be shown. This parameter window shows a premise 22 or a conclusion 24. In FIG. 4 a premise 22 is shown. The parameter 25 or parameters 25 may thereby be changed by a user. The device is also arranged such that a user in a simple manner may add or remove rules 14 and add or remove premises 22 or conclusions 24 which form part of the different rule blocks 31. An advantage with the device is that the premises 22 and conclusions 24 are written in a natural language and are thus easy to understand for a user without any particular knowledge of programming.

The device may also be arranged to in response to a command from a user show a window which includes all the premises 22 or conclusions 24 which are available for the rules 14 for a certain state 30 or a certain rule block 31. An example of such a window is given in the above cited WO-publications.

It should be noted that it may vary from state 30 to state 30 which rule blocks 31 which form part thereof. However, preferably all states 30 comprise a kind of rule block 31 which describes the rules 14 for when a transition to another state 30 takes place.

When the device is run, the different rules 14 in a rule block 31 is suitably dealt with in order. This is for example thereby done by starting with the first premise 22 in the first rule 1 whereafter the other premises 22 and conclusions 24 in the first rule 1 follow. Thereafter follows the same order for the second rule 2, etc. The different rule blocks 31 which form part of a state 30 may suitably be gone though in order. The device also includes means with which a user can set with which frequency the different rules 14 shall be gone through. Suitably, the device is arranged such that the rule block 31 is left as soon as a conclusion 24, or possibly several conclusions 24 in a rule 14 in the rule block 31 has been executed, or as soon as the execution of the rule system leads to the fact that some other rule 14 (or other state 30) gets a higher priority.

The device which is used in the method according to the present invention is suitably arranged in order to enable for a user to via said second means 20 name different states 30, rule blocks 31 or rules 14. This may for example be done in the following manner. In for example the rule block window which is shown in FIG. 3 a user may, for example, with the help of the computer mouse click on a certain rule 14. Thereby the rule 14 in question is identified. This can also be shown in that the rule 14 gets a certain marking. Below to the right in FIG. 3 a square 54 is shown with name of the rule 14. The user may thus here type in a suitable name of the rule 14. For example, the rule 14 may be named in accordance with the conclusion 24 which is meant to be executed according to the rule 14 if all conditions in the premises 22 are fulfilled. In a similar manner, the device may suitably be arranged such that a user in a simple manner may name rule blocks 31 and states 30.

The device which is used in the method according to the invention is arranged to show a decision support window (see FIG. 5). In this window information is shown which can constitute a support for a user of the device. The device is arranged such that the structure of the rule system or names on rules which have been defined by a user automatically decide which information is to be shown in the decision support window. This decision support window is thus automatically generated by a user, for example in that the user in advance carries out changes in the rule system in the manner which has been described in connection with FIGS. 2-4.

In the decision support window suitably a number of states 30 are shown in a similar manner to that which has been described in connection with FIG. 2. If the device has two rule handlers 41, 42 in accordance with the description above, suitably the decision support window may show different kinds of markings. A first kind of marking 51 here consists of a broken frame. The marking 51 may also consist of any other marking, for example of a red frame. The first marking 51 (in this case at "Escape") marks the name of the state in which the first rule handler 41 is. FIG. 5 also shows a second kind of marking 52. This marking 52 consists in this case of a continuous line around the name of a state (in this case "Attack"). The second marking 52 marks the state 30 or the name of the state 30 in which the second rule handler 42 is. Both kinds of markings 51, 52 may thus be shown simultaneously in the window according to FIG. 5. A user of the device may for example activate the second rule handler 42 by clicking on a certain state 30. Thereby this state 30 is marked with the second marking 52. Simultaneously, the state 30 in which the first rule handler 41 is marked with the first marking 51. The user may deactivate the second rule handler 42 for example by clicking again on the state 30 in question. The second marking 52 thereby disappears.

The device is also arranged to on command from a user in this window show an area 56 which represents a state 30. The command may for example be that the user clicks on the square 57 which is located to the right of the names of the states. In this case, the area 56 thus represents the state 30 "Attack". Within this area 56, names are shown of some or all rules 14 which form part of the state 30. Furthermore, suitably also the name of the rule blocks 31 which form part of the state 30 is shown. The rule blocks 31 are suitably illustrated by a square. Within this square, suitably the names of the different rules 14 which form part of the rule block 31 in question are shown. The device is suitably arranged such that the name of a rule 14 which is shown in the area 56 in the decision support window is shown within a marked area. In FIG. 5 these marked areas are shown as a square around the rule name 14 itself. Such a marked area may also be called a "button".

The device is arranged such that when a user for example names a rule 14, as has been described above in connection with FIG. 3, the name (or "the button") which represents this rule 14 is automatically generated in the decision support. This means that when the decision support window is shown, automatically the names ("buttons") for the rule or rules 14 which have been named will be shown within said area 56, when said area 56 which represents the state 30 in question is shown in the decision support window.

As has been described above in connection with FIG. 2 a user also has the possibility of modifying the states 30 by adding states 30 or by removing states 30. The user also has the possibility of naming states 30 and to change the position of the states 30 in the network or hierarchy of states 30. The device is arranged such that when a user modifies the states 30 in this manner, the decision support will automatically be modified in the corresponding manner. This means that when the decision support window is shown, the states 30 are automatically shown, in accordance with the modifications of the states 30 that the user has carried out. The decision support window thus shows the state structure in accordance with the modifications of the user.

In the case that the device has two rule handlers 41, 42, the names ("buttons") of the rules 14 which are activated or recommended for the moment according to the first rule handler 41 are suitably provided with a first kind of marking 51 in the decision support window. The names of the rules 14 which are activated according to the second rule handler 42 are suitably marked with a second kind of marking 52.

The device is suitably arranged such that the user via said second means 20 may input instructions which mean that one or more conclusions 24 which form part of a certain rule 14, the name of which is currently shown in said area 56 in the decision support window, shall be executed. Such an inputted instruction may also be called "decision". For example, the device may be arranged such that the user inputs said instructions concerning a decision by clicking with a computer mouse when a marker is on the marked area which represents a certain rule 14. The decision thus means that the user is of the opinion that the conclusion 24 or the conclusions 24 which form part of a certain rule 14 shall be executed when the user clicks with the computer mouse on the "button" which represents the rule 14 in question.

Since the device is arranged to show a decision support window according to FIG. 5, a user obtains a very good overview over the rule handling. If the device comprises two rule handlers 41, 42 such as has been described above, a user obtains via the decision support window also support for which state 30 and which rules 14 that are recommended in accordance with the first rule handler 41. At the same time, the user may make decisions which go against the rules which are recommended according to the first rule handler 41. The user suitably makes decisions that the conclusion 24 in a certain rule 14 shall be executed in the manner which has been described above. Alternatively, the user may make decisions in other manners. For example, if the device is run in a real or a simulated entity 44, decisions may be considered to have been made in that the user carries out certain operations. If the entity 44 for example is an aircraft, the user may input different control commands or other commands via the input members which form part of the craft 44. These decisions made may be sensed and registered. Decisions made may also be inputted in other manners. For example, a user may give commands via a microphone.

Figure 6:
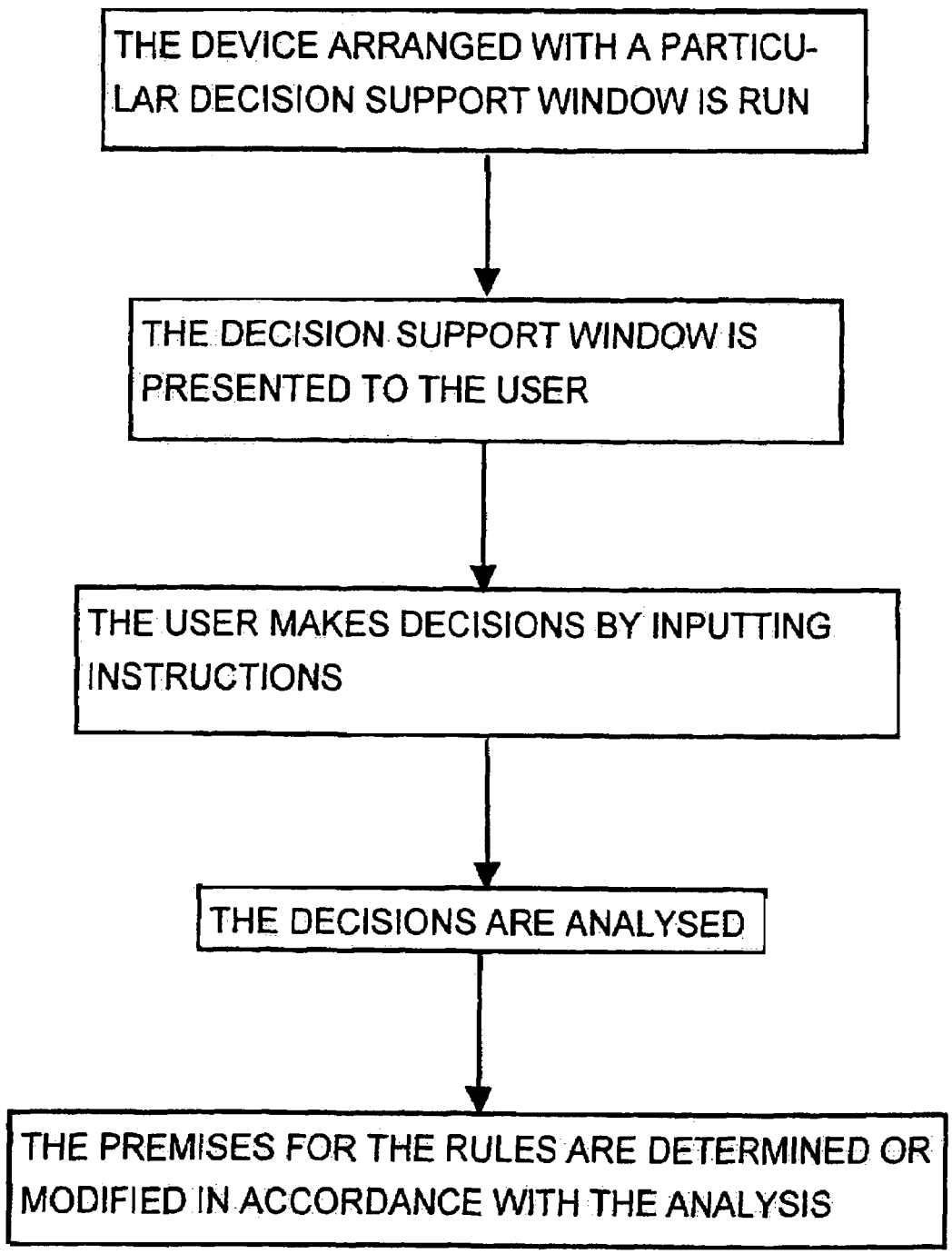
FIG. 6 shows a schematic flow chart for a method according to one aspect of the present invention.

An example of a method according to the invention will now be described with reference to the flow chart in FIG. 6. According to the method, a device of for example the kind which has been described above is used. The device is run in a real or a simulated version of said entity 44 in such a manner that the entity 44 goes through a behavior or a behavior scenario. With "behavior" is thus here meant a real behavior in a real entity 44. By "behavior scenario" is here meant a behavior in a simulated version of the entity 44. The simulated version may thus for example consist of a flight simulator if the entity 44 is an aircraft.

The above described decision support window is presented to a user. The user thereby sees for example which rules 14 which are available in a certain state 30.

The user makes decisions by via said second means 20 inputting instructions which mean that a certain rule 14, the name of which is currently shown in the area 56 in the decision support window, shall be executed. This means that the conclusion or conclusions 24 which form part of the rule 14 should be executed according to the opinion of the user.

The device may be run in this manner one or a plurality of times.

The decisions which have been made by the user during the run are thereafter analysed. The analysis is preferably done automatically with the help of the device. Alternatively, the analysis may be carried out with the help of another computer.

The premises 22 for the rules 14 for which the user has made decisions according to the above are determined or modified in accordance with the analysis which has been carried out.

The above described method may be carried out in different manners. According to a first embodiment, the device is arranged such that said rules 14 are only partly ready-formulated in such a manner that at least a plurality of premises 22 which may be true or false, are defined for a plurality of the rules 14, but without these premises 20 yet have been assigned any of said indicators 32 which indicate some of said conditions. With reference to FIG. 3, it can in other words be said that the premises 22 are ready-formulated but the indicators 32 for the different premises have not yet been established. When the device is run, it is registered whether said premises 22 are true or false (i.e., are fulfilled or nor not fulfilled) at the occasions when the user makes decisions in the manner which has been described above. The device may be run a plurality of times in this manner. The registered premises values (i.e. whether the premises 22 are true or false) are suitably processed statistically. Thereby, it is for example possible to obtain information about that when the user makes a certain decision, a certain premise 22 was often, or always, fulfilled. On the basis of this statistical processing, suitable indicators 32 for the different premises 22 in the rule 14 in question may be established. In such a manner, the rules 14 may be determined.

According to a second alternative manner of carrying out the method, at least a plurality of premises 22 comprises a parameter 25 which is such that when the parameter 25 has been determined, the premise 22 in question will have a truth value. With a truth value is here meant that the premise 22 is true or false. According to this embodiment of the method, the rules 14 are only partly ready-formulated such that at least a plurality of premises 22 are defined without that a value of the parameter 25 in question has been determined. With reference to FIG. 3, this means that for example the parameters 25 which are shown in the fourth and fifth premise from above have not yet been established. When the device is run, the value of the parameters 25 in question are registered at the occasions when the user makes said decisions. Suitably, the device is run a plurality of times in this manner. Thereafter the obtained registrations are statistically processed. Thereby information can be obtained about which parameter values that were the case when the different decisions were made. By statistical processing suitable parameter values may thereby be established. Thereby, the premises 22 can be determined with parameter values such that the rules 14 can be established.

According to a third manner of carrying out the method, the device is arranged such that at least a plurality of the rules 14 are ready-formulated. This thus means that the premises 22 are defined such that they have a truth value. If the premises 22 comprise a parameter, then the value of the parameter 25 has been established. Furthermore, the premises 22 have been assigned said indicators 32. The device is in this case suitably arranged with a first 41 and a second 42 rule handler in the manner which has been described above. The device is run and a user can make decisions which mean that a rule 14 shall be executed, i.e. that the conclusion or conclusions 24 which form part of the rule 14 shall be executed. The device is arranged such that the user can make this decision even if the ready-formulated rules 14 in accordance with the first rule handler 41 do not say that the conclusion or conclusions 24 in question shall be executed. When the device is run, the user thus makes such decisions. At the occasions when the user makes decisions, a registration takes place of whether the premises 22 were true or false. A comparison is done between said registrations at the run and the previous ready-formulated rules 14. The run may suitably be done a plurality of times. By analysing the obtained registrations, information may thus be obtained about how the made decisions deviate from the decisions which should have been made according to the ready-formulated rules 14. By a statistical processing, the rules 14 can thereby be modified on the basis of the comparison and of the statistical processing which has been made.

With a method according to the invention, rules 14 may thus be established or modified in a relatively simple manner. A high quality of the set of rules can thereby be achieved. This is a great advantage when the device is used as a decision support in a real entity 44.

The present invention is not limited to the described examples. The invention may thus be modified and varied within the scope of the following claims.

The invention claimed is:

1. A method of establishing rules for a device used for generating decision support for user decisions which determine the behavior of an aircraft or aircraft simulation system, and/or for controlling the behavior of the aircraft or aircraft simulation system wherein said method comprises the steps of:

providing a device comprising:
  a supervising unit arranged to handle a rule system for the behavior, wherein the supervising unit comprises at least one storage member in which a rule structure comprising a set of completely or partly ready-formulated rules for the behavior is stored,
  a user interface comprising first means for presenting information to a user of the device and second means for inputting instructions to said supervising unit,
wherein the device is arranged such that said rule structure is such that a rule comprises one or more premises and one or more conclusions,
wherein the device is arranged such that the rule system is divided into a plurality of states for different parts of said behavior, wherein each state comprises one or more said rules,
wherein the device is arranged to via said first means present a decision support window which comprises at least one area which represents one of said states, wherein this area comprises names which identify different rules which form part of the states;
wherein the device is arranged such that the rule system is divided into a plurality of rule blocks, each of which comprises one or more rules, wherein each state comprises one or more rule blocks, wherein the rules within a certain rule block concern a certain aspect of the behavior within the state in question and wherein the device is arranged such that said area in the decision support window also comprises the name of one or more rule blocks which form part of the state;

running said device in a real or simulated version of said aircraft or aircraft simulation system, or user thereof such that the aircraft or aircraft simulation or user thereof goes through a behavior scenario, presenting said decision support window to a user, recommending, a via said decision support window, a said state or rule, allowing the user to make decisions by, via said second means, inputting instructions which mean that one or more conclusions which form part of certain rule, the name of which is currently shown in said area in the decision support window, shall be executed, analyzing the decisions which have been made by the user, and determining or modifying the rules and recommendations for which the user has made decisions concerning that one or more conclusions shall be executed out in accordance with the analysis that has been carried out.

2. A method according to claim 1, wherein the device is arranged such that said premises shall be able to either be true or false and wherein said conclusions are predetermined and pre-programmed, and wherein the device is arranged such that said rule structure is such that each premise in the rule can be assigned an indicator which can indicate at least two different conditions, namely a first condition which means that the premise shall be true and a second condition which means that the premise shall be false, wherein at least one conclusion is intended to be executed if all of said premises fulfill the conditions set by the assigned indicators, and wherein said method is such that said rules which are determined or modified in accordance with the analysis which has been carried out determined or modified in that the premises for these rules are determined or modified in accordance with the analysis which has been carried out.

3. A method according to claim 2, wherein said device is arranged such that said rule structure is such that each premise in the rule also can be assigned an indicator which can indicate a third condition which means that it does not matter whether the premise is true or false in order for said one or more conclusions to be intended to be executed.

4. A method according to claim 2, wherein said device is arranged such that said rules are only partly ready-formulated such that at least a plurality of premises, which can be true or false, are defined for a plurality of said rules, but without these premises yet have been assigned any of such indicators which indicate some of said conditions, wherein when said device is run it is registered whether said plurality of premises are true or false at the occasions when the user makes said decisions which mean that one or more conclusions which form part of a certain rule shall be executed.

5. A method according to claim 4, further comprising, after said registration has been done at one or more runs, statistically processing the obtained registrations, thereby establishing ready-formulated rules.

6. A method according to claim 1, wherein said device is arranged such that said rules comprise a plurality of premises which comprises at least one parameter which, when a value for this parameter has been determined, causes the premise to have a truth value such that the premise is true or false, wherein said rules are only partly ready-formulated such that at least a plurality of premises are defined without that a value of said parameter has been determined, wherein when said device is run, the value of said parameters are registered at the occasions when the user makes said decisions which means that one or more conclusions which form part of a certain rule shall be executed.

7. A method according to claim 6, further comprising, after said registrations have been done at one or more runs, statistically processing the obtained registrations, thereby establishing suitable values for the parameters in the rules.

8. A method according to claim 2, wherein said device is arranged such that at least a plurality of said rules are ready-formulated in such a manner that at least a plurality of premises are defined for the rules such that the premises have a truth value such that the premises are true or false and such that these premises have been assigned said indicators, wherein the device is arranged such that the user can make decisions which mean that one or more conclusions which form part of a certain rule shall be executed even if the ready-formulated rule in question does not say that the conclusion or conclusions shall be executed, wherein when said device is run, the user makes said decisions which mean that one or more conclusions which form part of a certain rule shall be executed, wherein registration takes place, at the occasions when the user makes said decisions, of whether the premises were true or false.

9. A method according to claim 8, further comprising making a comparison between said registration at the run and said ready-formulated rules.

10. A method according to claim 9, further comprising reformulating said ready-formulated rules on the basis of said comparison.

11. A method according to claim 2, wherein said device is arranged to such that the rule structure is such that each conclusion in a rule is assigned an indicator which can indicate two different cases, a first case which indicates that the conclusion shall be executed or a second case which indicates that the conclusion shall not be executes, wherein a conclusion is meant to be executed if all of said premises in the rule fulfill the conditions set by the assigned indicators and the indicator of the conclusion indicates said first case.

12. A method according to claim 1, wherein said device is arranged such that said name of a rule which is shown in said area in the decision support window is shown within a marked area, wherein the device is arranged such that the user inputs said instructions, which mean that one or more conclusions which form part of a certain rule shall be executed, by inputting a command when a marker is at or on said marked area.

* * * * *